United States Patent [19]

Sobajima et al.

[11] 3,947,373

[45] Mar. 30, 1976

[54] ELECTRICALLY INSULATING POWDERY MATERIAL, A PROCESS FOR ITS PREPARATION AND THERMALLY CONDUCTING AND ELECTRICALLY INSULATING FILLED RESIN COMPOSITION USING SAID INSULATING POWDERY MATERIAL AS FILLER

[75] Inventors: Shigenobu Sobajima; Minoru Tamura, both of Hachioji; Yoichi Azuma; Kiyoshi Takekata, both of Hino, all of Japan

[73] Assignee: Teijin Ltd., Osaka, Japan

[22] Filed: Aug. 12, 1974

[21] Appl. No.: 496,834

[30] Foreign Application Priority Data

Sept. 12, 1973 Japan ............................ 48-102223

[52] U.S. Cl............. 252/63.2; 252/63.5; 260/37 M; 106/288 B; 106/286; 174/110 A; 174/110 SR

[51] Int. Cl.$^{2}$.... H01B 3/00; C08L 5/00; H01B 7/00

[58] Field of Search.................... 252/63.2, 63.5, 63; 106/286, 288 B, 290; 260/37 M; 174/110 A, 110 SR

[56] References Cited

UNITED STATES PATENTS

| | | | |
|---|---|---|---|
| 2,280,517 | 4/1942 | Ridgway | 252/63.5 |
| 2,622,537 | 11/1971 | Needham | 252/63.5 |

*Primary Examiner*—John D. Welsh
*Attorney, Agent, or Firm*—Sherman & Shalloway

[57] ABSTRACT

An electrically insulating powdery material with a volume resistivity of at least $1 \times 10^{10}$ ohms-cm, which consists of a calcined product of a mixture of magnesium oxide with boron oxide and if desired, at least one of titanium, iron and chromium oxides and has a special novel structure wherein a core of magnesium oxide particles is surrounded by a sheath of a double oxide of the magnesium oxide and the boron oxide and if desired, the other metal oxide. This insulating powdery material is produced by calcining the above mixture under specified calcining conditions determined by a special temperature-time relation. A thermally conducting and electrically insulating resin composition especially having superior electrical properties under high temperature-high humidity conditions can be prepared using the above powdery material as a filler.

7 Claims, 7 Drawing Figures

Figure 1:
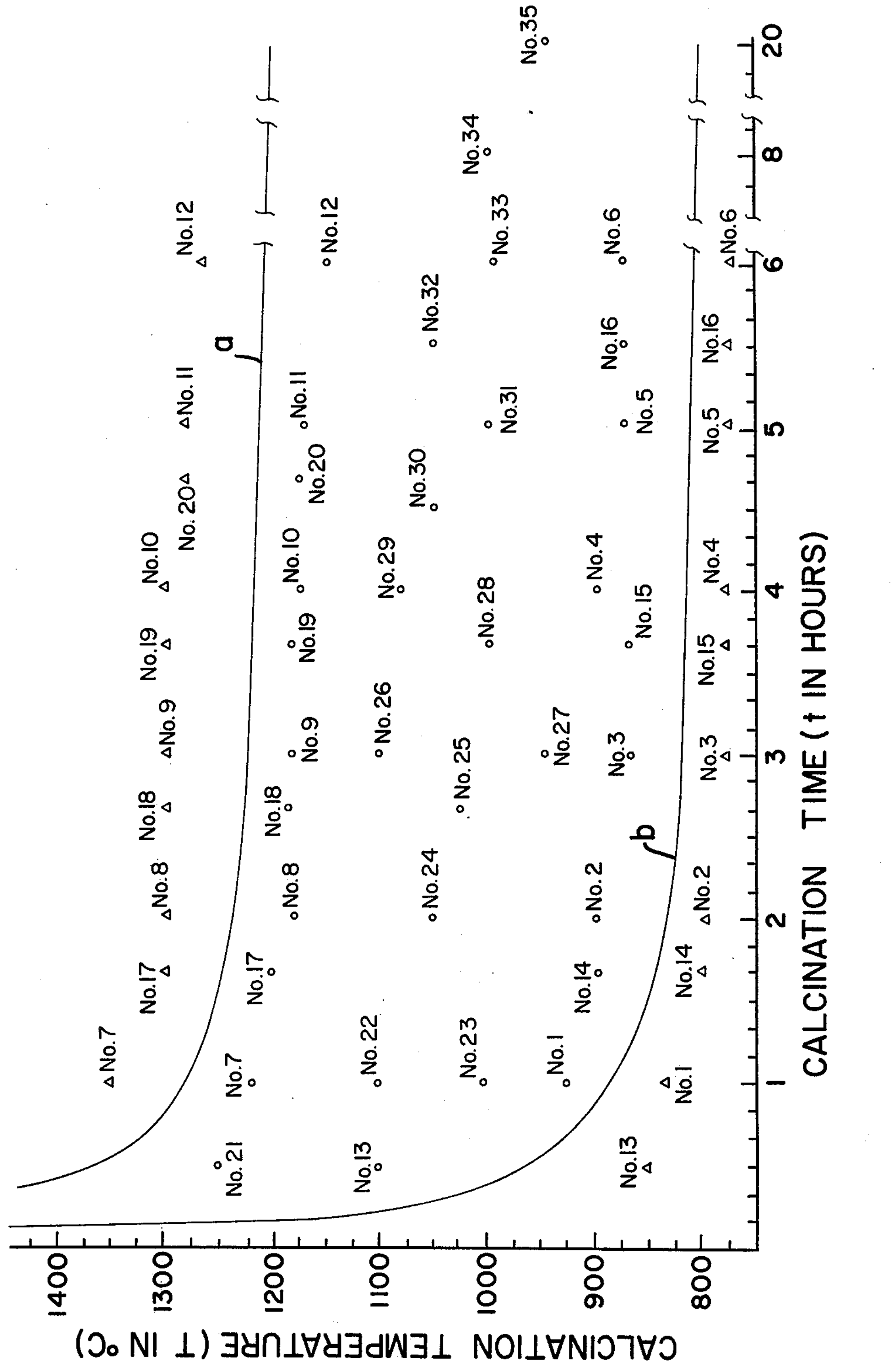

Fig. 2-a
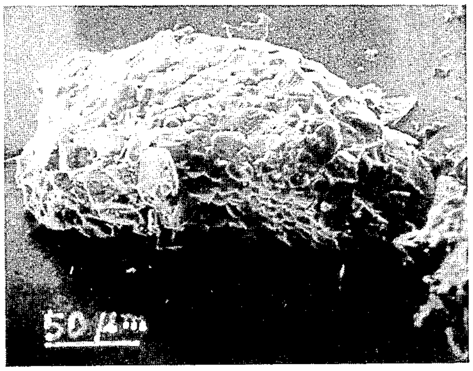
Fig. 2-b
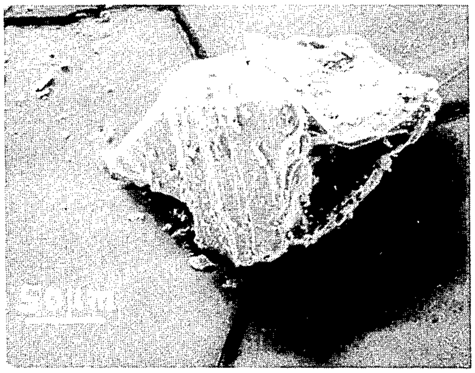
Fig. 2-c

Fig. 3-a
Fig. 3-a'
Fig. 3-b
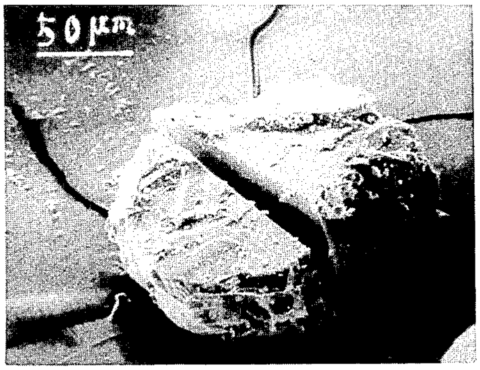

ELECTRICALLY INSULATING POWDERY MATERIAL, A PROCESS FOR ITS PREPARATION AND THERMALLY CONDUCTING AND ELECTRICALLY INSULATING FILLED RESIN COMPOSITION USING SAID INSULATING POWDERY MATERIAL AS FILLER

This invention relates to an electrically insulating powdery material of superior moisture resistance having a sheath-and-core structure and a volume resistivity of at least $1 \times 10^{10}$ ohms.cm, usually at least $1 \times 10^{11}$ ohms.cm, the volume resistivity being measured after boiling for 40 hours in boiling water a resin composition consisting of 100 parts by weight of a resin and uniformly dispersed therein 250 parts by weight of the powdery material. The invention also pertains to a thermally conductive and electrically insulating filled resin composition containing the powdery material as a filler, which has various improved properties such as superior thermal conductivity, water resistance, dimensional stability and crack resistance and exhibiting superior electrical properties under high temperature-high humidity conditions.

More specifically, it relates to a electrically insulating powdery material of a calcined product of a mixture of magnesium oxide and another metal oxide; characterized in that i. said powdery material comprises a core of magnesium oxide particles and a sheath of a double oxide formed thereon in a surrounding manner,
ii. said double oxide is a member selected from a double oxide of magnesium oxide and boron oxide and a double oxide of magnesium oxide, boron oxide and a metal oxide selected from the group consisting of titanium oxide, iron oxide and chromium oxide, and
iii. said powdery material has a volume resistivity of at least $1 \times 10^{10}$ ohms.cm, the volume resistivity being measured after boiling for 40 hours in boiling water a resin composition consisting of 100 parts by weight of a resin and uniformly dispersed therein 250 parts by weight of the powdery material;

a process for its preparation, and also a thermally conducting and electrically insulating filled resin composition containing the above powdery material as a filler.

An electrically insulating resin composition having a filler of MgO which has been baked at a temperature of not less than 1000°C. is known (British Pat. No. 1,256,077, German Pat. No. 1,817,799, Canadian Pat. No. 912,722, and French Pat. No. 1,593,854). In this prior art, it is disclosed that MgO may be premixed with other fillers such as $SiO_2$ before it is subjected to heat treatment at a temperature above 1000°C., and that the result obtainable when MgO is calcined in admixture with $SiO_2$ or the like is substantially the same as that obtained when MgO alone is calcined.

These prior patents do not at all give any description which would suggest that a calcined product of MgO and other fillers may give the same result as a calcined product of MgO alone, and further do not refer to the possibility of utilizing boron oxide, titanium oxide, iron oxide, chromium oxide, and titanium, iron, chromium compounds capable of forming their oxides, respectively, under calcining conditions as fillers.

Japanese Pat. No. 1898/63 (published on Mar. 8, 1963) discloses that an electrically insulating material is produced by calcining a mixture of MgO and not more than 15% by weight, based on the weight of MgO, of boron oxide with a view to eliminating the defect that MgO filler is reduced in electric resistance at an elevated temperature.

This patent discloses that the upper limit of the amount of the boron oxide is critical, and that best results are obtained when it is 7% and improved effects can be obtained when the amount is up to 15%. Furthermore, this patent discloses that by calcining the above mixture at 1300°C. for 3 hours, a calcined product of the same particle size as the starting MgO was obtained, and the resulting calcination product can be used as a filler for sheath heater.

This patent, however does not at all disclose the incorporation of the calcination product as a filler in a resin so as to provide an electrically insulating resin composition. Furthermore, this patent denies the utilization of boron oxide in an amount exceeding 15%, and is quite silent on other conditions than the calcination temperature of 1300°C. and the calcination time of 3 hours.

We have found that the calcined MgO filler in the first of the above-mentioned prior patents is seriously deteriorated in electrical characteristics when placed under high temperature-high humidity conditions, and under these conditions, the dimensional stability and crack resistance of the MgO filler become extremely poor and the filler becomes infeasible.

In order to eliminate such a calcined MgO filler, we studied the latter prior technique mentioned above, and found that when a mixture of MgO and 7% (the amount considered most suitable in the above latter technique) of boron oxide was calcined at 1300°C. for 3 hours, the resulting calcined product cannot exhibit satisfactory electric characteristics under high temperature-high humidity conditions.

We furthered our investigations in order to solve the technical problem that under high temperature-high humidity conditions, the conventional calcined products are difficult to use or cannot be used, and consequently found a special correlation between the calcination temperature and the calcination time for a mixture of MgO and boron oxide. Furthermore, we found that a calcination product of a mixture of MgO and boron oxide obtained by calcining it under the calcination conditions which satisfy this special correlation gives rise to the solution of the above technical problem and exhibits outstandingly superior high temperature-high humidity resistant properties. Furthermore, by employing these specific calcination conditions, the boron oxide can be used in an amount even exceeding 15%.

Further investigations led to the discovery that a mixture of MgO and boron oxide calcined under the calcining conditions satisfying this special correlation between the calcining temperature and the calcining time can contain titanium oxide, iron oxide, chromium oxide, titanium, iron, chromium compounds capable of forming their oxides, respectively, under the calcining conditions.

The above discovery is quite unexpected in view of the recognition of the prior art mentioned above. As a result of determining the cause of such an unexpected result, we found that the calcined product obtained under such specified calcination conditions consists of a core of magnesium oxide particles and a sheath of double oxide formed thereon in a surrounding manner, and has a novel special structure in which a sheath of a double oxide (a compound of higher order composed of two or more metal oxides) such as magnesium ortho- and pyro-borate covers the entire surface of the core particles of MgO, and is chemically bound thereto.

In view of the conventional belief that in the latter prior technique mentioned above, the vacant lattice sites of magnesium oxide having lattice defects are filled as a result of calcining a mixture of it with boron oxide to form a crystalline structure of pure magnesium oxide, it was quite unexpected that a calcined product having such a special sheath-core structure can be formed.

We further found that the calcined product having the above specified structure as a result of calcination under the above specified calcination conditions has a volume resistivity of at least $1 \times 10^{10}$ ohms.cm. after boiling in boiling water for 40 hours as described in detail hereinbelow, and this property is the most convenient measure for detecting the formation of a structure wherein a sheath of double oxide is chemically bound to magnesium oxide core particles while covering the entire surfaces of the magnesium oxide particles.

Accordingly, an object of this invention is to provide an electrically insulating powder material consisting of a calcined product of a mixture of magnesium oxide and boron oxide which may optionally contain at least one compound selected from the group consisting of titanium oxide, iron oxide, chromium oxide, titanium, iron, chromium compounds capable of forming their oxides, respectively, under the calcination conditions, which powdery material possesses a special double oxide sheath-MgO core capable of maintaining superior improved properties even under high temperature-high humidity conditions.

Another object of this invention is to provide a process for preparing such an electrically insulating powdery material.

A still another object of this invention is to provide a thermally conductive and electrically insulating resin composition with superior improved properties which contains a powdery material filler incorporated therein.

Many other objects and advantages of this invention will become more apparent from the following description.

The electrically insulating powdery material is characterized in that:

i. it comprises a core of magnesium oxide particles and a sheath of a double oxide formed thereon in a surrounding manner,
ii. the double oxide is a member selected from a double oxide of magnesium oxide and boron oxide and a double oxide of magnesium oxide, boron oxide and a metal oxide selected from the group consisting of titanium oxide, iron oxide and chromium oxide, and
iii. the powdery material has a volume resistivity of at least $1 \times 10^{10}$ ohms.cm, the volume resistivity being measured after boiling for 40 hours in boiling water a resin composition consisting of 100 parts by weight of a resin and uniformly dispersed therein 250 parts by weight of the powdery material.

The metal oxides selected from the group consisting of titanium oxide, iron oxide and chromium oxide may be used either alone or in admixture of two or more. Of these metal oxides, titanium oxide is preferred. If the iron oxide is used in a great quantity, the calcined product tends to impart magnetism to an electrically insulating resin composition when used as a filler for it. Thus, the use of such a calcined product is limited in uses where such a tendency is not desirable.

The structure mentioned in (i) above can be ascertained by the following method.

[I] TEST A

Preparation of Sample

One gram of the powdery material was sampled by the quatering method from the lot of the powdery material to be tested. A small amount of sample was collected at random from this powder. The sample powder collected was sprayed onto one surface of an adhesive tape having an adhesive surface on both sides, and the other surface was adhered to a sample stand. Carbon was deposited in vacuum on the surface on which the sample powder had been sprayed, and then gold was coated on it by vacuum deposition.

Device and measuring conditions

The surfaces of the particles were observed using a scanning electron microscope (MSM-2 type; Hitachi-Akashi Company, Japan) with an accelerated voltage of 15 KV and a magnification of 100 to 10,000 X.

Evaluation

When the formation of a sheath was observed on the surface of at least 99% of the total number of particles which is usually several hundred, the calcined product is evaluated as having the sheath-core structure specified in the present invention. FIG. 2-*a*(400X) shows a photograph of a scanning electron microscopic image of one particle in the product of this invention. To facilitate comparisons, FIGS. 2-*b*(400X) and 2-*c*(400X) show similar photographs of particles not having the sheath-core structure of this invention (Comparative Example 9 hereinbelow) and particles of calcined MgO.

[II] TEST B

Preparation of Sample

The remainder of the powder from which a small amount of the sample had been collected at random in Test A above was transferred to a mortar, and pulverized by beating strongly. A small amount of a sample was collected at random from the pulverized particles using a spatula. The collected sample powder was sprayed on one surface of an adhesive tape having an adhesive surface on both sides, and the other surface was adhered to a sample stand. Subsequently, the same procedure as in Test A was performed to form a sample.

Device and measuring conditions

The sectional structure of the cut particles was observed using the same device and measuring conditions as in Test A.

Evaluation

When it was observed that at least 99% of the cut particles had a sheath-core structure, the calcination product was evaluated as having the sheath-core structure specified in the present invention.

FIG. 3-*a* shows a photograph of the product of this invention (400 X), and FIG. 3-*a'*, a photograph of a part of the above product (5000 X; in the photo, the left side shows a sheath layer portion). In order to facilitate comparisons, FIG. 3-*b* shows a similar photograph (400 X) of the particles obtained in Comparative Example 9 which did not have the sheath-core structure of this invention.

The thickness of the sheath of a double oxide such as magnesium borate ($3MgO.B_2O_3$ and/or $2MgO.B_2O_3$), a mixture of magnesium borate ($3MgO.B_2O_3$ and/or $2MgO.B_2O_3$), magnesium titanate ($MgO.TiO_2$ and/or $2MgO.TiO_2$) and titanium borate ($TiBO_3$), a mixture of magnesium borate ($3MgO.B_2O_3$ and/or $2MgO.B_2O_3$), magnesium ferrate ($MgO.Fe_2O_3$) and iron borate ($FeBO_3$), or a mixture of magnesium borate ($3MgO.B_2O_3$ and/or $2MgO.B_2O_3$), magnesium chromate ($MgO.Cr_2O_3$) and chromium borate ($CrBO_3$), is such that the sheath envelops the entire surfaces of the MgO core particles so that the powdery material has a volume resistivity of at least $1 \times 10^{10}$ ohms.cm, preferably at least $1 \times 10^{11}$ ohms.cm, when measured after boiling for 40 hours in boiling water a resin composition consisting of 100 parts by weight of a resin and 250 parts by weight of the powdery material uniformly dispersed therein. However, it is preferred that the thickness is not more than about 50%, usually 2 to 30%, of the average particle size of the particles of the powdery material. This average thickness can be measured and calculated by the following method.

In the Test B for the detection of the sheath-core structure, the thickness of the largest thickness portion of the sheath and the thickness of the smallest thickness portion of the sheath in the photograph (5000 X) are measured with respect to two particles. Then, an arithmetic mean of these measured values is calculated. The particle size is calculated as an arithmetic average value of the maximum diameters and minimum diameters of two particles. The average thickness is expressed as a percent of the above average sheath thickness based on the average particle size.

The above double oxide (ii) can be identified by an X-ray diffraction method.

The characteristic of the powdery material mentioned in (iii) above can be measured by the following method.

A molding composition of the following formulation is prepared using a powder of a calcined product obtained by the quatering method same as in Test A above.

| | |
|---|---|
| Epikote 828 (a product of Shell Company; a normally liquid bisphenol-type epoxy resin with a molecular weight of about 355, an epoxide equivalent of 182 to 194 and a viscosity at 25°C. of 110 to 150 poises) | 100 parts by weight |
| Zinc stearate (mold releasing agent) | 4 parts by weight |
| Diaminodiphenyl methane (curing agent) | 27 parts by weight |
| Calcination product powder | 250 parts by weight |

The above composition is fabricated by a low pressure transfer molding method to form disk-like samples each with a diameter of 50 mm and a thickness of 2 mm. Two of these samples are boiled for 40 hours in water kept under boiling conditions, and then withdrawn and immersed for 30 minutes in cold water. The moisture is wiped off with a gauze fabric, and after 2 minutes, its volume resistivity (RV) is measured in accordance with ASTM D257 using an insulation resistance tester (SM-10 type, a product of Toa Denpa Kogyo K.K., Japan).

The electrically insulating powdery material of a calcined product of a mixture of magensium oxide and another metal oxide can be prepared by calcining a mixture selected from the group consisting of a mixture of magnesium oxide and boron oxide, and mixtures of magesium oxide, boron oxide and a member selected from the group consisting of titanium oxide($TiO_2$), iron oxide($Fe_2O_3$), chromium oxide($Cr_2O_3$), an iron compound capable of forming iron oxide ($Fe_2O_3$) under the calcining conditions, such as iron (III) hydroxide and a chromium compound capable of forming chromium oxide ($Cr_2O_3$) under the calcination conditions, such as chromium (III) chloride or chromium (III) hydroxide under conditions which satisfy the following relation:

$$\frac{80}{t} + 800 < T < \frac{80}{t} + 1200$$

wherein $T$ is the calcining temperature (°C), $t$ is the calcining time (hr), and $t \geqq 1/12$.

The relation between the calcining temperature and the calcining time is shown in FIG. 1, in which the area defined by curve *a* ($T = 80/t + 1200$) and curve *b* ($T = 80/t + 800$) meets the calcining conditions specified in the present invention. The points marked by circular symbols with numbers show examples of the present invention in which the numbers represent those of Examples in the specification. The points marked by triangular symbols with numbers show comparisons in which the numbers represent those of Comparative Examples in the specification.

Referring to FIG. 1, if $t$ is not more than 1/12 hour, uniform calcining results are difficult to obtain. Preferably at least 1/6 hour, more preferably at least ⅓ hour, can be employed as the calcining time. Too long periods of calcining time are useless, and therefore, a proper calcining time should be selected. Although depending somewhat on the calcining means, a calcining time of about 10 minutes ($t = 1/16$) to about 20 hours ($t = 20$), especially, about 20 minutes ($t = ⅓$) to about 6 hours ($t = 6$), is usually preferred.

In the process of this invention, it is sufficient that a sheath of the double oxide envelops the entire surfaces of the MgO core particles. The boron oxide may be mixed in an amount sufficient for the double oxide formed by calcination to cover the entire surfaces of the MgO core particles, although the amount can be properly varied depending upon the particle size of the starting MgO particle, the particle size of the other metal oxide to be mixed with it, etc. Usually, it is preferred to use boron oxide in an amount of at least about 3% based on the weight of magnesium oxide. More preferably, the amount of boron oxide is at least about 5% by weight. It is possible to use boron oxide in an amount equal to or greater than that of magnesium oxide, but usually, amounts up to about 60% by weight of the mageneium oxide are sufficient. Accordingly, the preferred mixture of magnesium oxide and boron oxide is one composed of magensium and about 3 to 60%, based on the weight of the magnesium oxide, of boron oxide. In the case of a mixture of magnesium oxide, boron oxide and the above-mentioned Ti, Fe or Cr component, the preferred mixture consists of 65 to 95% by weight of magnesium oxide, 5 to 20% by weight of boron oxide, not more than 30% by weight of $TiO_2$, or 50 to 95% by weight of MgO, 5 to 20% by weight of $B_2O_3$ and not more than 40% by weight of $Fe_2O_3$ (where the iron compound capable of forming $Fe_2O_3$ under the calcining conditions is used, its amount is calculated as $Fe_2O_3$), or 50 to 95% by weight of MgO, 5 to 20% by weight of $B_2O_3$ and not more than 40% by weight of $Cr_2O_3$ (where the chromium compound capable of forming $Cr_2O_3$ under the calcining conditions is used, its amount is calculated as $Cr_2O_3$), the amounts being based on the weight of the resulting mixture.

It is necessary in this invention that the above starting mixture is calcined under the calcining conditions shown above. As will be shown experimentally by a number of Comparative Examples, when the calcining conditions expressed by the above relation are not met, it is impossible for the powdery material of the calcined product to attain a volume resistivity of at least $1 \times 10^{10}$ ohms.cm. For Example, in Comparative Example 9 (shown by Δ No. 9 in Figure), the product obtained by calcining a mixture of MgO and 7%, based on the weight of MgO, of boron oxide at 1300°C. for 3 hours has a volume resistivity of $6.2 \times 10^8$ ohms-cm (the best result disclosed in the above cited Japanese Pat. No. 1898/63). In contrast, the product obtained in accordance with the process of this invention by calcining the same mixture at 1180°C. for 3 hours (Example 9 shown by o No. 9 in FIG. 1) has a volume resistivity of $8.0 \times 10^{10}$ ohms-cm. This shows a marked difference in resistance to high temperature and high humidity.

If the above calcination conditions are not fulfilled in the process of this invention (for example, on the lower temperature side of the curve *b* in FIG. 1), a sheath of the double oxide is difficult to form. Furthermore, on the high temperature side of the curve *a*, the particles of the starting calcination product often agglomerate, and it becomes necessary to break the agglomerate into the individual particles. Since the particles in this agglomerate are bonded to one another firmly, it is difficult to break it into the individual particles, and particles having the structure (i) defined in this invention cannot be obtained. This is presumably because if the agglomerate is forcibly disintegrated, the sheath of double oxide would be broken. As a result, the resulting calcined product does not possess a volume resistivity of at least $1 \times 10^{10}$ ohms-cm. Even if the above agglomeration does not occur, the improvement intended by this invention cannot be achieved, although the reason for it has not been clear. Although not bound by any theory, we assume that under such conditions. a sheath of double oxide of the desired composition is difficult to form; and/or the desired sheath of double oxide once formed becomes porous or is cracked and thus fails to cover the entire surface of the core sufficiently; an/or it becomes impossible to form a sheath of double oxide covering the entire surface of the core.

According to the process of this invention, the surface layer of the starting magnesium oxide particles is converted to a sheath of double oxide while the magnesium oxide powder substantially maintains its particle size, and agglomeration scarcely occurs. Even when agglomeration occurs, the agglomerate can be distinguished by slight stress. The individual particles become a calcined product having the sheath-core structure meeting the requirement (i) of the present invention. There is no particular restriction on the method of calcination. Any methods by which a mixture of MgO and the other metal oxide or a compound capable of being converted to it under the calcination conditions is uniformly calcined can be employed. For example, in a laboratory-scale or small-scale production, calcination can be performed using an electric furnace such as a resistance furnace. In mass production, calcination can be performed using a brick kiln such as a tunnel kiln or a rotary kiln.

The starting MgO or other metal oxide or the metal compound capable of forming the other metal oxide under the calcination conditions may contain minor amounts of impurities that may usually be contained therein, for example, metal components such as Al, Si, V, In, Ga, Ca, Mn, Na, K, Ni, or Cu. The amount of such impruities is usually less than about 1% by weight, most usually less than about 0.1% by weight, as metal.

The particle size of the starting MgO can be properly selected according to the desired particle size of the calcined product. Usually, it is preferred to use MgO having an average particle size of about 30 to about 8000 mesh (Tyler's mesh; hereinafter, all mesh sizes are of Tyler's), preferably about 30 to 2000 mesh. The particle size of the starting boron oxide can be selected properly according to such factors as the particle size of the starting MgO or the amount of the boron oxide used. Usually, the particle size of the boron oxide is preferably not larger than 65 mesh, more preferably not larger than 400 mesh. The particle size of the member selected from the group consisting of titanium oxide, iron oxide, chromium oxide, the iron compound capable of forming iron oxide under the calcining conditions and the chromium compound capable of forming chromium oxide under the calcining conditions can be properly selected according to the particle size of the starting MgO or the amount of such a member used. Usually, it has a particle size of preferably about 100 to about 10000 mesh, more preferably about 1000 to about 10000.

The type of the starting MgO used in this invention is not particularly restricted. Examples of the type that can be used in this invention include electrically fused magensium oxide obtained by heating MgO to a temperature above about 2800°C. (its melting point), cooling the molten MgO gradually, and pulverizing the resulting solid, hard-burning magnesium oxide obtained by calcining MgO at a temperature of about 1000° to about 2000°C., the pulverized product of magnesia fibers, and whiskers. The use of the electrically fused magnesium oxide is most preferred.

The electrically insulating powdery material of this invention consisting of a calcined product of a mixture of magnesium oxide and boron oxide which may optionally contain another metal oxide or a compound capable of forming the other metal oxide under the calcination conditions can be used for various electrical and/or thermally conducting usages. It is especially useful in a thermally conducting and electrically insulating resin composition. Typical examples of use are packaging resin fillers for integrated circuits, large-scale integrated circuits, transistors, diodes, thin film circuits and many other assemblies, cast resin fillers such as transformers, capacitors or resistors, and coatings and adhesives of parts requiring thermal dissipation in the electrical and electronics component industry.

Thus, according to this invention, there can be provided a thermally conducting and electrically insulating resin composition containing a powdery material of a calcined product of a mixture of magnesium oxide and another metal oxide uniformly dispersed therein, characterized in that:

i. said powdery material comprises a core of magnesium oxide particles and a sheath of a double oxide formed thereon in a surrounding manner, ii. said double oxide is a member selected from a double oxide of magensium oxide and boron oxide and a double oxide of magnesium oxide, boron oxide and a metal oxide selected from the group consisting of titanium oxide, iron oxide and chromium oxide, and iii. said powdery material has a volume resistivity of at least 1 × $10^{10}$ ohms.cm, the volume resistivity being measured after boiling for 40 hours in boiling water a resin composition consisting of 100 parts by weight of a resin and uniformly dispersed therein 250 parts by weight of the powdery material.

For use as fillers, the powdery material of this invention is used in an amount of preferably at least 5% by volume, more preferably at least about 15% by volume, based upon the volume of the resin composition. Usually, amounts up to about 65% by volume are sufficient. The powdery material can be incorporated in the resin by any desired methods. For example, an epoxy resin compound for transfer molding is prepared by (i) dissolving a mold releasing agent in the liquid resin, (ii) dispersing the powdery material of this invention and a pigment in the resin, (iii) adding a curing agent, and mixing the components well, (iv) spreading the uniform mixture in the form of a plate having a thickness of 1 to 2 cm, (v) allowing the mixture to stand until the softening point becomes sufficiently high and it can be powdered thereby to bring it to a B-stage, and then pulverizing the mixture, and then (vi) ageing the resulting powder. As another example, injection molding pellets of polyhexmethylene sebacamide are prepared by uniformly blending the polyhexamethylene sebacamide chips and the powdery material of this invention by a V-type blender, sufficiently drying the mixture, and extruding the mixture by an extruder to pelletize it.

Accordingly, the resin composition in accordance with this invention can be in such forms as a two-package coating liquid resin composition or paste, and molding powder, granules, flakes or pellets.

The type of the resin used in the resin composition of this invention is not limited in particular, and any resin which can be filled with an inorganic filler can be used. Thus, the resin may, for example, be a synthetic thermosetting resin, a synthetic thermoplastic resin, or a natural or synthetic rubber, or a blend of these in suitable combinations. Specific examples include thermoplastic resins such as bisphenol A-type, novolac-type, or cycloaliphatic epoxy resin, silicone, phenolics such as phenol formaldehyde, unsaturated polyesters, polyurethane, amino resins such as urea or melamine resins, or alkyds such as diallyl phthalate or diisophthalate and dough molding compounds; thermoplastic resins such as polyethylene, polypropylene, polystyrene, polycarbonate, polyamides such as poly-ε-capramide, polyhexamethylene adipamide, or polyhexamethylene sebacamide, polyesters such as polyethylene terephthalate, or polyethylene-2,6-naphthalenedicarboxylate, acrylic resins, or polyvinvl chloride; synthetic rubbers such as thermosetting hydrocarbons, e.g., polybutadiene or a butadiene-styrene copolymer product; and natural rubber.

The thermally conducting and electrically insulating filled resin composition of this invention may also have other conventional fillers and inorganic pigments incorporated therein together. Examples of such conventional fillers are clay mineral powders such as kaolin, glass powder, asbestos, glass fibers, mica, talc, quartz powder, or glass microballoons. The amount of these fillers and inorganic fillers can be selected as desired, but usually, it is about 10 to about 50% by volume based on the volume of the final resin composition.

The following Examples and Comparative Examples illustrate the present invention in greater detail.

EXAMPLES 1 TO 20 AND COMPARATIVE EXAMPLES 1 TO 20

In each run, electrically fused magnesia having the average particle size indicated in Table 1 and boron oxide having the average particle size indicated in Table 1 and in some examples, the other metal oxide or the compound convertible to the metal oxide under the calcining conditions having the average particle size indicated in Table 1 were well mixed in the amounts indicated in Table 1. 250 G of the mixture was filled in an un-pressed state in an aluminum crucible (250cc), and placed in an electric furnace, where it was calcined under the conditions shown in Table 1 to form the electrically insulating powdery material. The results are shown in Table 1.

Table 1

| | | Magnesia | | Boron oxide | | Other metal oxide or metal compound | | | Calcining conditions | | Calcined product | | | |
|---|---|---|---|---|---|---|---|---|---|---|---|---|---|---|
| | | Average particle size (mesh) | Amount (g) | Average particle size (mesh) | Amount (g) | Name | Average particle size (mesh) | Amount (g) | Temperature (°C) | Time (hr) | Average particle size (mesh) | (i) Sheath-core structure (thickness in microns of the sheath) | (ii) double oxide | (iii) Volume resistivity (Ω-cm; after 40 hour boiling in boiling water) |
| Ex. | 1 | 400 | 85 | 8000 | 15 | — | — | — | 925 | 1 | 400 | yes (3.7) | 3MB, 2MB | $8.2\times10^{12}$ |
| Comp. | 1 | '' | '' | '' | '' | — | — | — | 830 | 1 | 400 | no | — | $7.3\times10^{8}$ |
| Ex. | 2 | 100 | 93 | 8000 | 7 | — | — | — | 900 | 2 | 100 | yes (6.3) | 3MB, 2MB | $9.0\times10^{11}$ |
| Comp. | 2 | '' | '' | '' | '' | — | — | — | 800 | 2 | 100 | no | — | $7.1\times10^{7}$ |
| Ex. | 3 | 250 | 88 | 500 | 12 | — | — | — | 870 | 3 | 250 | yes (5.0) | 3MB, 2MB | $2.1\times10^{11}$ |
| Comp. | 3 | '' | '' | '' | '' | — | — | — | 780 | 3 | 250 | no | — | $8.0\times10^{8}$ |
| Ex. | 4 | 200 | 90 | 8000 | 10 | — | — | — | 900 | 4 | 200 | yes (4.8) | 3MB, 2MB | $7.7\times10^{12}$ |
| Comp. | 4 | '' | '' | '' | '' | — | — | — | 780 | 4 | 200 | no | — | $3.5\times10^{8}$ |

Table 1-continued

| | | Magnesia | | Boron oxide | | Other metal oxide or metal compound | | | Calcining conditions | | | Calcined product | | |
|---|---|---|---|---|---|---|---|---|---|---|---|---|---|---|
| | | Average particle size (mesh) | Amount (g) | Average particle size (mesh) | Amount (g) | Name | Average particle size (mesh) | Amount (g) | Temperature (°C) | Time (hr) | Average particle size (mesh) | (i) Sheath-core structure (thickness in microns of the sheath) | (ii) double oxide | (iii) Volume resistivity (Ω-cm; after 40 hour boiling in boiling water) |
| Ex. | 5 | 150 | 90 | 1000 | 10 | — | — | — | 875 | 5 | 150 | yes (6.7) | 3MB, 2MB | $6.0\times10^{11}$ |
| Comp. | 5 | " | " | " | " | — | — | — | 780 | 5 | 150 | no | — | $2.1\times10^{8}$ |
| Ex. | 6 | 325 | 80 | 1000 | 20 | — | — | — | 875 | 6 | 325 | yes (7.5) | 3MB, 2MB | $6.9\times10^{11}$ |
| Comp. | 6 | " | " | " | " | — | — | — | 780 | 6 | 325 | no | — | $4.1\times10^{8}$ |
| Ex. | 7 | 100 | 95 | 1000 | 5 | — | — | — | 1220 | 1 | 100 | yes (4.3) | 3MB | $1.1\times10^{11}$ |
| Comp. | 7 | " | " | " | " | — | — | — | 1350 | 1 | 100 | no | 3MB (not covering the entire surface) | $3.3\times10^{7}$ |
| Ex. | 8 | 800 | 80 | 2000 | 20 | — | — | — | 1180 | 2 | 800 | yes (3.1) | 3MB | $1.2\times10^{13}$ |
| Comp. | 8 | " | " | " | " | — | — | — | 1300 | 2 | 800 | no | 3MB (not covering the entire surface) | $1.1\times10^{9}$ |
| Ex. | 9 | 65 | 93.5 | 8000 | 6.5 | — | — | — | 1180 | 3 | 65 | yes (8.0) | 3MB | $8.0\times10^{11}$ |
| Comp. | 9 | " | " | " | " | — | — | — | 1300 | 3 | 65 | no | 3MB (not covering the entire surface) | $6.2\times10^{8}$ |
| Ex. | 10 | 150 | 90 | 8000 | 10 | — | — | — | 1180 | 4 | 150 | yes (6.7) | 3MB | $7.8\times10^{11}$ |
| Comp. | 10 | " | " | " | " | — | — | — | 1300 | 4 | 150 | no | 3MB (not covering the entire surface) | $8.8\times10^{8}$ |
| Ex. | 11 | 325 | 70 | 2000 | 30 | — | — | — | 1180 | 5 | 325 | yes (10.8) | 3MB | $5.9\times10^{11}$ |
| Comp. | 11 | " | " | " | " | — | — | — | 1280 | 5 | 325 | no | 3MB (not covering the entire surface) | $6.2\times10^{7}$ |
| Ex. | 12 | 35 | 96 | 8000 | 4 | — | — | — | 1150 | 6 | 35 | yes (13.4) | 3MB | $4.1\times10^{10}$ |
| Comp. | 12 | " | " | " | " | — | — | — | 1270 | 6 | 35 | no | 3MB | $7.5\times10^{8}$ |
| Ex. | 13 | 325 | 85 | 3000 | 15 | — | — | — | 1100 | ½ | 325 | yes (4.6) | 3MB | $8.9\times10^{12}$ |
| Comp. | 13 | " | " | " | " | — | — | — | 850 | ½ | 325 | no | — | $7.0\times10^{8}$ |
| Ex. | 14 | 200 | 70 | 8000 | 10 | $TiO_2$ | 8000 | 20 | 900 | 1⅓ | 200 | yes (21.0) | 3MB, 2MB, TB,MT | $7.6\times10^{12}$ |
| Comp. | 14 | " | " | " | " | " | " | " | 800 | 1⅓ | 200 | no | — | $9.0\times10^{7}$ |
| Ex. | 15 | 200 | 85 | 8000 | 10 | $TiO_2$ | 8000 | 5 | 870 | 3⅓ | 200 | yes (7.4) | 3MB,2MB, MT,TB | $8.1\times10^{12}$ |
| Comp. | 15 | " | " | " | " | " | " | " | 780 | 3⅓ | 200 | no | — | $1.5\times10^{9}$ |
| Ex. | 16 | 100 | 70 | 2000 | 10 | $Fe_2O_3$ | 2000 | 20 | 870 | 5½ | 100 | yes (30.0) | 3MB,2MB, MF,FB | $2.6\times10^{11}$ |
| Comp. | 16 | " | " | " | " | " | " | " | 780 | 5½ | 100 | no | — | $7.8\times10^{8}$ |
| Ex. | 17 | 250 | 80 | 2000 | 15 | $Fe_2O_3$ | 2000 | 5 | 1180 | 1⅓ | 250 | yes (10.6) | 3MB,2MB, MF,FB | $5.9\times10^{12}$ |
| Comp. | 17 | " | " | " | " | " | " | " | 1300 | 1⅓ | 250 | no | 3MB,2MB, MF (not covering the entire surface) | $6.0\times10^{8}$ |
| Ex. | 18 | 100 | 70 | 4000 | 10 | $Cr_2O_3$ | 4000 | 20 | 1180 | 2⅓ | 100 | yes (24.4) | 3MB,MC, CB | $9.0\times10^{11}$ |
| Comp. | 18 | " | " | " | " | " | " | " | 1300 | 2⅓ | 100 | no | 3MB,MC, CB (not covering the entire surface) | $3.8\times10^{7}$ |
| Ex. | 19 | 250 | 80 | 4000 | 15 | $Cr_2O_3$ | 4000 | 5 | 1180 | 3⅓ | 250 | yes (28.0) | 3MB,MC CB | $1.3\times10^{13}$ |
| Comp. | 19 | " | " | " | " | " | " | " | 1300 | 3⅓ | 250 | no | 3MB,MC, CB (not covering the entire surface) | $2.1\times10^{8}$ |
| Ex. | 20 | 250 | 65 | 4000 | 10 | $TiO_2$<br>$Fe_2O_3$ | 8000<br>2000 | 15<br>10 | 1180 | 4⅓ | 250 | yes (24.4) | 3MB,2MT, MF,TB,FB | $1.0\times10^{12}$ |
| Comp. | 20 | " | " | " | " | " | " | | 1280 | 4⅓ | 250 | no | 3MB,2MT, | $9.1\times10^{8}$ |

Table 1-continued

| | Magnesia | | Boron oxide | | Other metal oxide or metal compound | | | Calcining conditions | | | Calcined product | | |
|---|---|---|---|---|---|---|---|---|---|---|---|---|---|
| | Average particle size (mesh) | Amount (g) | Average particle size (mesh) | Amount (g) | Name | Average particle size (mesh) | Amount (g) | Temperature (°C) | Time (hr) | Average particle size (mesh) | (i) Sheath-core structure (thickness in microns of the sheath) | (ii) double oxide | (iii) Volume resistivity (Ω-cm; after 40 hour boiling in boiling water) |
| Control | 400* | — | — | — | — | — | — | 1200 | 3 | 400 | no | MF,TB,FB (not covering the entire surface) | $2.5\times10^{7}$ |

*Electrically fused magnesia same as used in Example 1.
3MB = $3MgO.B_2O_3$, 2MB = $2MgO.B_2O_3$, MT = $MgO.TiO_2$, TB = $TiBO_3$
MF = $MgO.Fe_2O_3$, CB = $CrBO_3$, FB = $FeBO_3$, MC = $MgO.Cr_2O_3$

EXAMPLES 21 TO 35

Example 1 was repeated except that each of the mixtures shown in Table 2 was calcined under the conditions shown in Table 2. The results are also shown in Table 2.

The volume resistivity was measured by the method described hereinbefore. The thermal conductivity was measured by the following method.

The resin composition was fabricated into disc-like samples having a diameter of 30 mm and a thickness of 1 mm, 2 mm, and 3 mm, respectively.

Table 2

| | Magnesia | | | Boron oxide | | Other metal oxide or metal compound | | | Calcining conditions | | Calcined product | | | |
|---|---|---|---|---|---|---|---|---|---|---|---|---|---|---|
| Examples | Type | Average particle size (mesh) | Amount (g) | Average particle size (mesh) | Amount (g) | Name | Average particle size (mesh) | Amount (g) | Temperature (T) °C | Time (t) hr. | Average particle size (mesh) | (i) sheath-core structure (Thickness in microns of the sheath) | (ii) double oxide | (iii) Volume resistivity (Ω-cm after 40 hour boiling in boiling water |
| 21 | Electrically fused MgO | 35 | 95 | 2000 | 5 | — | — | — | 1250 | 0.5 | 35 | 8.7 | 3MB | $6.1\times10^{11}$ |
| 22 | " | 100 | 93 | 4000 | 7 | — | — | — | 1100 | 1 | 100 | 5.3 | 3MB | $2.3\times10^{12}$ |
| 23 | " | 150 | 90 | 4000 | 10 | — | — | — | 1000 | 1 | 150 | 5.5 | 3MB,2MB | $5.8\times10^{12}$ |
| 24 | " | 250 | 85 | 8000 | 15 | — | — | — | 1050 | 2 | 250 | 6.0 | 3MB,2MB | $6.2\times10^{12}$ |
| 25 | " | 400 | 85 | 4000 | 15 | — | — | — | 1025 | 2⅔ | 400 | 2.9 | 3MB,2MB | $1.2\times10^{13}$ |
| 26 | " | 150 | 70 | 8000 | 10 | $TiO_2$ | 8000 | 20 | 1100 | 3 | 150 | 5.3 | 3MB,MT, TB | $2.6\times10^{12}$ |
| 27 | " | 35 | 70 | 8000 | 10 | $Fe_2O_3$ | 2000 | 20 | 950 | 3 | 35 | 81.0 | 3MB,2MB, MF,FB | $8.1\times10^{11}$ |
| 28 | " | 200 | 65 | 8000 | 15 | $Cr_2O_3$ | 4000 | 20 | 1000 | 3⅔ | 200 | 11.3 | 3MB,2MB, MC,CB | $3.2\times10^{11}$ |
| 29 | " | 250 | 60 | 8000 | 10 | $TiO_2$ $Fe_2O_3$ | 8000 2000 | 15 15 | 1075 | 4 | 250 | 8.0 | 3MB,MT, MF,TB,FB | $6.5\times10^{11}$ |
| 30 | Hard burning MgO | 400 | 85 | 2000 | 15 | — | — | — | 1050 | 4.5 | 400 | 2.9 | 3MB,2MB | $8.2\times10^{12}$ |
| 31 | " | 1000 | 85 | 8000 | 15 | — | — | — | 1000 | 5 | 1000 | 2.5 | 3MB,2MB | $9.0\times10^{12}$ |
| 32 | " | 4000 | 80 | " | 20 | — | — | — | 1050 | 5.5 | 4000 | 0.4 | 3MB,2MB | $6.1\times10^{11}$ |
| 33 | " | 8000 | 70 | 12000 | 30 | — | — | — | 1000 | 6 | 8000 | 0.4 | 3MB,2MB | $3.7\times10^{11}$ |
| 34 | " | 400 | 60 | 8000 | 20 | $TiO_2$ | 8000 | 20 | 1000 | 8 | 400 | 10.8 | 3MB,2MB, MT,TB | $3.1\times10^{11}$ |
| 35 | " | 400 | 60 | 8000 | 20 | $Fe_2O_3$ | 2000 | 20 | 950 | 20 | 400 | 10.8 | 3MB,2MB MF,FB | $3.9\times10^{11}$ |

EXAMPLES 36 TO 50

The thermal conductivity and the volume resistivity of each of the resin compositions shown in Table 3 were measured, and the results are shown in Table 3. The calcined products used as fillers were those obtained in some of the above Examples and Comparative Examples.

The measuring apparatus was a thermal conductivity measuring apparatus (Type HC-111, a product of Takara Thermistor Instruments Co., Ltd.). The temperature at the upper portion of the furnace and that at its lower portion were set at 80°., and 50°C., respectively, and the measurement was made at 65°C. A heat-conducting paste was coated on both surfaces of each of the samples, and was held between brass rods. The temperature gradient of the brass rods, and the temperature gradient of the sample were measured. The thermal conductivity of the sample was obtained by using the known thermal conductivity of brass as a standard for comparison.

The results are shown in Table 3.

Table 3

| | Composition | | | | | | Properties | |
|---|---|---|---|---|---|---|---|---|
| | Calcine product used | | Resin | | Other filler | | | |
| Examples | Type* | Amount (vol.% based on the resin composition) | Name** | Amount (Vol.%) | Name | Amount (Vol.%) | (i) Thermal conductivity (cal/cm.sec.°C) | (ii) Volume resistivity (40HR-Boil,Ω-cm) |
| 36 | Ex. 9 | 40 | Polystyrene | 60 | — | — | $25.5\times10^{-4}$ | $3.4\times10^{12}$ |
| 37 | Ex. 24 | 40 | Epoxy(1) | 60 | — | — | $27.0\times10^{-4}$ | $6.2\times10^{12}$ |
| 38 | Ex. 23 | 40 | Silicone | 60 | — | — | $19.5\times10^{-4}$ | $2.1\times10^{12}$ |
| 39 | Ex. 4 | 40 | Nylon 6–10(2) | 60 | — | — | $25.0\times10^{-4}$ | $1.2\times10^{12}$ |
| 40 | Ex. 31 | 40 | Synthetic(3) rubber | 60 | — | — | $13.5\times10^{-4}$ | $2.9\times10^{12}$ |
| 41 | Ex. 14 | 40 | Epoxy(1) | 60 | — | — | $25.2\times10^{-4}$ | $7.6\times10^{12}$ |
| 42 | Ex. 16 | 40 | Epoxy (1) | 60 | — | — | $23.1\times10^{-4}$ | $2.6\times10^{11}$ |
| 43 | Ex. 18 | 40 | Epoxy(1) | 60 | — | — | $22.5\times10^{-4}$ | $9.0\times10^{11}$ |
| 44 | Comp. 2 | 40 | Epoxy(1) | 60 | — | — | $25.5\times10^{-4}$ | $7.1\times10^{7}$ |
| 45 | Comp. 9 | 40 | Epoxy(1) | 60 | — | — | $25.2\times10^{-4}$ | $6.2\times10^{8}$ |
| 46 | Control | 40 | Epoxy(1) | 60 | — | — | $28.7\times10^{-4}$ | $2.5\times10^{7}$ |
| 47 | Ex. 24 | 20 | Epoxy(1) | 80 | — | — | $12.0\times10^{-4}$ | $8.1\times10^{13}$ |
| 48 | Ex. 24 | 55 | Epoxy(1) | 45 | — | — | $61.5\times10^{-4}$ | $1.2\times10^{11}$ |
| 49 | Ex. 24 | 20 | Epoxy(1) | 60 | Quartz powder | 20 | $18.5\times10^{-4}$ | $5.3\times10^{12}$ |
| 50 | Ex. 24 | 20 | Nylon 6–10(2) | 60 | Clay | 20 | $14.7\times10^{-4}$ | $3.3\times10^{11}$ |

*Products obtained in the corresponding Examples and Comparative Examples.

**(1)Commercially available bisphenol A-type epoxy resin which is normally liquid and has a molecular weight of about 355, an epoxide equivalent of 182 – 194 and a viscosity at 25°C. of 110 – 150 poises.

(2)Polyhexamethylene sebacamide (3)Polybutadiene

What we claim is:

1. An electrically insulating powdery material of a calcined product of a mixture of magnesium oxide and another metal oxide; characterized in that i. said powdery material comprises a core of magnesium oxide particles and a sheath of a double oxide formed thereon in a surrounding manner, ii. said double oxide is a member selected from a double oxide of magnesium oxide and boron oxide and a double oxide of magnesium oxide, boron oxide and a metal oxide selected from the group consisting of titanium oxide, iron oxide and chromium oxide, and iii. said powdery material has a volume resistivity of at least $1 \times 10^{10}$ ohms-cm, the volume resistivity being measured after boiling for 40 hours in boiling water a resin composition consisting of 100 parts by weight of a resin and uniformly dispersed therein 250 parts by weight of the powdery material.

2. The electrically insulating powdery material of claim 1 wherein the average thickness of said sheath of double oxide is about 2 to about 50% of the average particle size of said powdery material.

3. A thermally conducting and electrically insulating resin composition comprising a resin and uniformly dispersed therein a powdery material of a calcined product of a mixture of magnesium oxide and another metal oxide; characterized in that i. said powdery material comprises a core of magnesium oxide particles and a sheath of a double oxide formed thereon in a surrounding manner, ii. said double oxide is a member selected from a double oxide of magnesium oxide and boron oxide and a double oxide of magnesium oxide, boron oxide and a metal oxide selected from the group consisting of titanium oxide, iron oxide and chromium oxide, and iii. said powdery material has a volume resistivity of at least $1 \times 10^{10}$ ohms.cm, the volume resistivity being measured after boiling for 40 hours in boiling water a resin composition consisting of 100 parts by weight of a resin and uniformly dispersed therein 250 parts by weight of the powdery material.

4. The resin composition of claim 3 wherein the amount of said powdery material is at least about 5% based on the volume of the resin composition.

5. A process for preparing an electrically insulating powdery material by calcining a mixture of magnesium oxide and another metal oxide or a metal compound capable of forming the metal oxide under the calcining conditions, characterized in that a mixture selected from the group consisting of a mixture of magnesium oxide and boron oxide and mixtures of magnesium oxide, boron oxide and a member selected from the group consisting of titanium oxide, chromium oxide, iron oxide, and titanium, iron, chromium compounds capable of forming their oxides, respectively, under the calcining conditions is calcined under the conditions expressed by the following expression:

$$\frac{80}{t} + 800 < T < \frac{80}{t} + 1200$$

wherein T is the calcining temperature (°C.), $t$ is the calcining time (hous), and $t \geqq 1/12$.

6. The process of claim 5 wherein the amount of boron oxide in the mixture is at least about 3% based on the weight of magnesium oxide.

7. The process of claim 6 wherein the amount of boron oxide in the mixture is not more than about 60% based on the weight of magnesium oxide.

* * * * *